(12) United States Patent
Sachs et al.

(10) Patent No.: US 10,543,643 B2
(45) Date of Patent: Jan. 28, 2020

(54) AUTOMATED DE-POWDERING VIA LIQUID IMMERSION

(71) Applicant: Desktop Metal, Inc., Burlington, MA (US)

(72) Inventors: Daniel Sachs, Sunnyvale, CA (US); Jamison Go, Orlando, FL (US); Robert J. Nick, Pepperell, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 16/456,123

(22) Filed: Jun. 28, 2019

(65) Prior Publication Data

US 2019/0344505 A1 Nov. 14, 2019

Related U.S. Application Data

(63) Continuation of application No. 15/892,895, filed on Feb. 9, 2018, now Pat. No. 10,406,751.
(Continued)

(51) Int. Cl.
*B29C 64/35* (2017.01)
*B22F 3/00* (2006.01)
(Continued)

(52) U.S. Cl.
CPC ............... *B29C 64/35* (2017.08); *B08B 3/12* (2013.01); *B08B 5/02* (2013.01); *B08B 7/028* (2013.01);
(Continued)

(58) Field of Classification Search
CPC ..... B29C 64/35; B29C 64/165; B29C 64/357; B33Y 40/00; B33Y 30/00; B33Y 10/00; B08B 5/02; B08B 7/028; B08B 3/12; B22F 3/1055; B22F 3/008; B22F 2003/1046; B22F 2003/1056; B22F 2003/1059; B22F 2301/00; B22F 2003/1058; Y02P 10/295
See application file for complete search history.

(56) References Cited

U.S. PATENT DOCUMENTS

| | | |
|---|---|---|
| 8,545,209 B2 | 10/2013 | Shi et al. |
| 9,887,356 B2 | 2/2018 | McAlpine et al. |
| (Continued) | | |

OTHER PUBLICATIONS

International Search Report and Written Opinion for PCT/US2018/027611 dated Aug. 29, 2018 entitled "Automated De-Powdering With Level Based Nesting".

*Primary Examiner* — Nahida Sultana
(74) *Attorney, Agent, or Firm* — Wolf, Greenfield & Sacks, P.C.

(57) ABSTRACT

According to some aspects, a de-powdering subsystem for an additive fabrication system is described. The de-powdering subsystem may comprise a bath subsystem. The bath subsystem may comprise a reservoir configured to contain a liquid and to accept objects to be de-powdered into the liquid, and an agitation facility configured to cause currents within the liquid. The agitator facility may be at least one of (i) a pump configured to circulate the liquid within the reservoir, (ii) a heating element configured to generate convection currents in the liquid, and (iii) a stirrer driven through a linkage to a motor. The bath subsystem may comprise at least one ultrasonic transducer configured to apply ultrasonic vibrations to the liquid within the reservoir.

9 Claims, 10 Drawing Sheets

Related U.S. Application Data

(60) Provisional application No. 62/485,835, filed on Apr. 14, 2017.

(51) Int. Cl.
| | | |
|---|---|---|
| *B29C 64/165* | (2017.01) | |
| *B33Y 10/00* | (2015.01) | |
| *B22F 3/105* | (2006.01) | |
| *B33Y 40/00* | (2015.01) | |
| *B08B 3/12* | (2006.01) | |
| *B08B 5/02* | (2006.01) | |
| *B08B 7/02* | (2006.01) | |
| *B33Y 30/00* | (2015.01) | |
| *B29C 64/357* | (2017.01) | |
| *B22F 3/10* | (2006.01) | |

(52) U.S. Cl.
CPC ............ *B22F 3/008* (2013.01); *B22F 3/1055* (2013.01); *B29C 64/165* (2017.08); *B29C 64/357* (2017.08); *B33Y 10/00* (2014.12); *B33Y 30/00* (2014.12); *B33Y 40/00* (2014.12); *B22F 2003/1046* (2013.01); *B22F 2003/1056* (2013.01); *B22F 2003/1058* (2013.01); *B22F 2003/1059* (2013.01); *B22F 2301/00* (2013.01); *Y02P 10/295* (2015.11)

(56) References Cited

U.S. PATENT DOCUMENTS

| | | |
|---|---|---|
| 10,406,751 B2 | 9/2019 | Fulop et al. |
| 2002/0090410 A1 | 7/2002 | Tochimoto et al. |
| 2004/0003738 A1 | 1/2004 | Imiolek et al. |
| 2011/0300248 A1 | 12/2011 | Tung et al. |
| 2013/0026680 A1 | 1/2013 | Ederer et al. |
| 2013/0081657 A1* | 4/2013 | Hewitt ............... B08B 3/12 134/25.1 |
| 2013/0244040 A1 | 9/2013 | Oshima |
| 2014/0141961 A1 | 5/2014 | Koszo et al. |
| 2016/0074911 A1 | 3/2016 | Dore |
| 2016/0271652 A1* | 9/2016 | Fukumoto ............ B08B 3/102 |
| 2016/0318253 A1 | 11/2016 | Barnhart |
| 2016/0368224 A1 | 12/2016 | Ooba et al. |
| 2017/0071707 A1 | 3/2017 | Uckelmann et al. |
| 2017/0297097 A1 | 10/2017 | Gibson et al. |
| 2018/0078975 A1* | 3/2018 | Bhoyar ............... B08B 3/12 |
| 2018/0117219 A1* | 5/2018 | Yang .................. B29C 41/00 |
| 2018/0133968 A1 | 5/2018 | Zeulner |
| 2018/0161829 A1* | 6/2018 | Horie ................. B08B 3/12 |
| 2018/0281295 A1* | 10/2018 | Tibbits ............... B29C 64/40 |
| 2018/0297114 A1 | 10/2018 | Preston et al. |
| 2018/0297284 A1 | 10/2018 | Fulop et al. |
| 2018/0305266 A1 | 10/2018 | Gibson et al. |
| 2018/0307209 A1 | 10/2018 | Chin et al. |
| 2018/0370213 A1 | 12/2018 | Gold et al. |
| 2019/0022942 A1 | 1/2019 | Fulop et al. |
| 2019/0076924 A1 | 3/2019 | Jepeal et al. |
| 2019/0084229 A1 | 3/2019 | Gunther |
| 2019/0184432 A1* | 6/2019 | Dore .................. B08B 3/006 |

\* cited by examiner

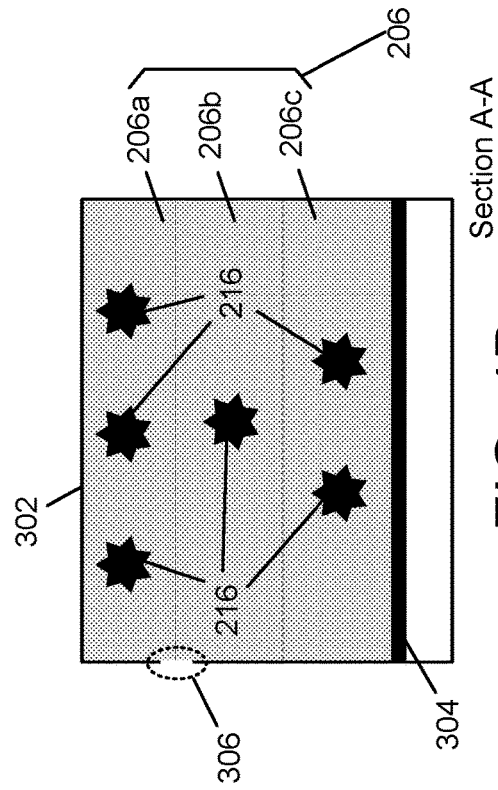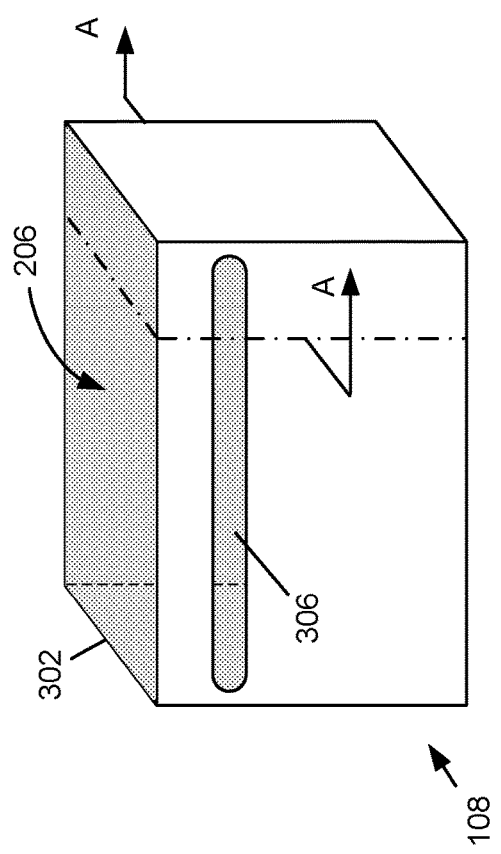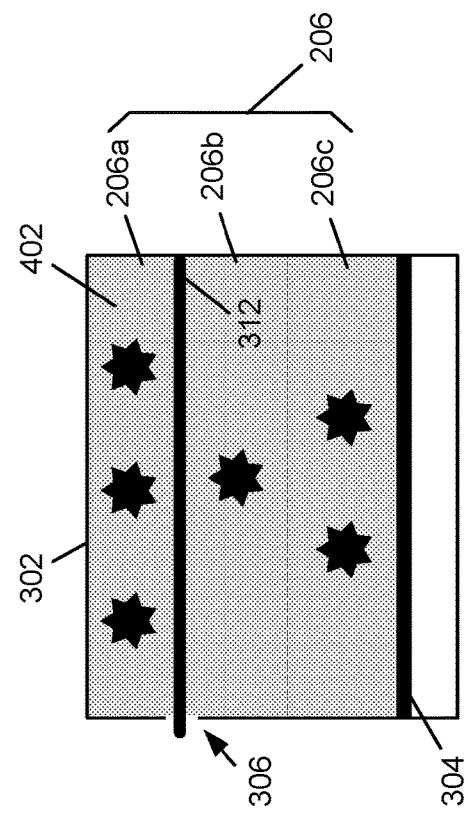

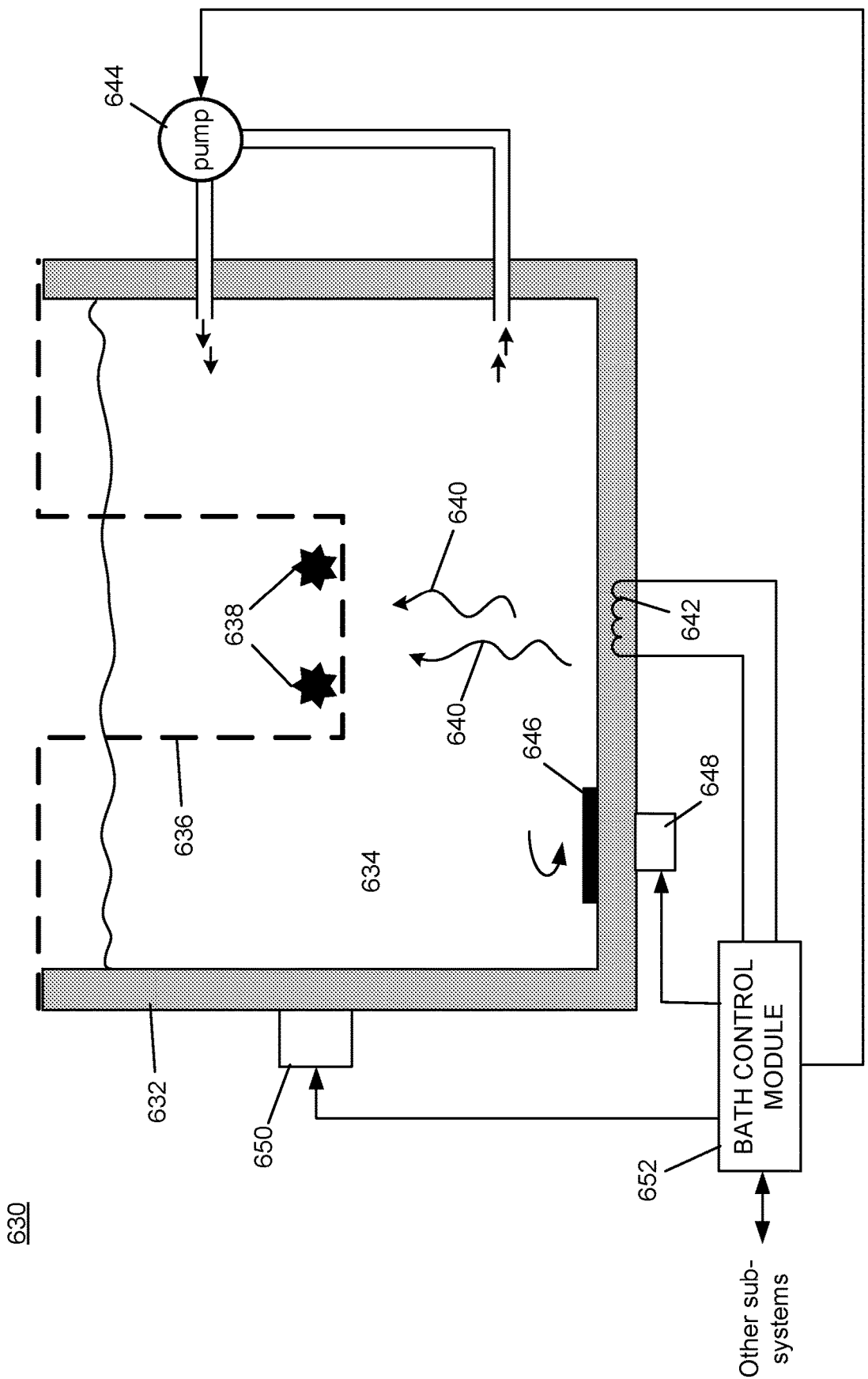

US 10,543,643 B2

AUTOMATED DE-POWDERING VIA LIQUID IMMERSION

CROSS-REFERENCE TO RELATED APPLICATIONS

This application is a continuation under 35 U.S.C. § 120 of U.S. patent application Ser. No. 15/892,895, filed on Feb. 9, 2018, titled "Automated De-Powdering With Level Based Nesting," which claims the benefit of U.S. Provisional Application No. 62/485,835, filed on Apr. 14, 2017. The entire teachings of the above applications are incorporated herein by reference.

BACKGROUND

Binder jetting is an additive manufacturing technique based on the use of a liquid binder to join particles of a powder to form a three-dimensional object. In particular, a controlled pattern of the liquid binder is applied to successive layers of the powder in a powder bed such that the layers of the material adhere to one another form a three-dimensional green part. Through subsequent processing, the three-dimensional green part can be formed into a finished three-dimensional part.

A binder jet fabrication system may comprise at least a printing subsystem, a build box (also known as job box) subsystem, a de-powdering subsystem and a sintering oven. The build box subsystem may comprise a powder print bed with a constituent object therein. In operation, the build box may be moved through the binder jet fabrication system, to be sequentially associated with other subsystems of the binder jet fabrication system.

In the case of more than one object within one build box, the objects may be vertically stacked to form a print bed stack of nested objects. Each layer of the stack may contain one or more object being fabricated. For nested objects, the de-powdering step may be complicated due to, for example, the substantial volume of unbound powder within the entire stack, as compared to an isolated powder print bed associated with only one level of objects, and the relative inaccessibility of objects buried deep within the stack.

SUMMARY

In the described embodiments, the build box subsystem works in conjunction with the de-powdering subsystem to separate a print bed stack, after printing of the powder print bed but before sintering, so that each nested object in the stack may be de-powdered individually and in isolation from the rest of the stack. Isolating the objects improves the ability to de-powder objects, for example by making the loose powder surrounding the objects more accessible, and reduces the volume of unbound powder to be removed, thereby reducing the complexity of powder removal.

The de-powdering subsystem and the build box subsystem may cooperate to isolate a print bed stack by inserting a separating blade horizontally into the print bed stack. Doing so creates an artificial floor below the top-most object in the stack, which separates the top-most object, and the unbound powder surrounding it, from the rest of the print bed stack. This stack separation is accomplished as the de-powdering subsystem guides a separating blade through an aperture in a side wall of the build box subsystem, and into the print bed stack. The separating blade is oriented parallel to the top surface of the print bed stack.

The de-powdering subsystem and the build box subsystem may cooperate to isolate a print bed stack through other techniques. For example, plates may be stacked on top of the build area, between different object levels, as each of the printing layers is completed. The separation plates would be in place upon completion of printing, and the de-powdering subsystem could utilize the separation plates without having to insert them. In some embodiments, plates may be inserted into the print bed stacks, between layers, after the layers have been printed. Doing so eliminates the need to re-establish a uniformly flat powder printing surface over a plate that is deployed prior to the beginning the next print layer. Re-establishing the uniformly flat powder printing surface may be required to compensate for irregularities in the planarity of the plate itself.

In one aspect, the invention may be a system for separating one or more objects within a stacked powder print bed of nested objects. The system may comprise a build box configured to contain the powder print bed. The build box may have a build box top and a build box floor. The system may further comprise at least one separating plate configured to be disposed between contiguous powder bed layers of the powder print bed, and a de-powdering subsystem configured to mechanically and electrically engage the build box.

The at least one separating plate may comprise a separating blade associated with the de-powdering subsystem. The separating blade may be configured to be inserted through an elongated aperture formed in a side wall of the build box and into the powder print bed between a top-most print bed layer of the nested objects and a second print bed layer directly below and contiguous with the top-most layer, thereby forming an isolated powder print bed between the separating blade and the build box top.

The de-powdering subsystem may comprise at least one air jet device configured to agitate unbound powder within the isolated powder print bed, and at least one vacuum device configured to withdraw the agitated unbound powder from the isolated powder print bed. The at least one air jet device may comprise a high-volume, coarse de-powdering air jet device, and a low volume, fine de-powdering air jet device. The at least one air jet device may be conveyed by a robotic arm to locations within the isolated powder print bed.

The robotic arm may be guided by a control system using information related to a surface associated with the one or more objects in a top-most layer of the powder print bed. The information related to the surface may be derived from a model of at least one object in the top-most layer of the powder print bed.

The de-powdering system further comprises a secondary agitator. The secondary agitator may comprise a mechanical vibration generator configured to convey mechanical vibrations to the build box. The mechanical vibration generator may convey vibrations to a particular region of the powder bed within the build box. The secondary agitator may comprise an ultrasonic generator for conveying ultrasonic energy to a particular region of the powder bed within the build box.

The build box may further comprise an elevator configured to raise the build box floor toward the build box top following a withdrawal of the separating blade, thereby moving the second object to a top-most position of the nested objects. The de-powdering subsystem is configured to re-insert the separating blade through the elongated aperture and into the powder print bed below the second object, thereby forming the isolated powder print bed between the separating blade and the build box top.

The de-powdering subsystem may comprise a washing device configured to convey a washing solution to one or more of the nested objects, a vacuum device configured to remove the washing solution conveyed to the one or more objects, and one or both of (i) an air jet device configured to dry the washing solution from the one or more objects and (ii) a heating device for applying a heat convection to the one or more objects. The one or more objects may have been printed with a binding material that is insoluble by the washing solution.

The system may further include a robotic arm configured to access and to manipulate at least one of the nested objects. The robotic arm may be configured to remove the at least one nested object from the powder print bed.

The system may further comprise a ramp associated with the build box. The ramp may be configured to accommodate conveyance of at least one of the nested objects from the powder print bed to a location outside of the build box. The system may further comprise a mechanical vibration generator configured to convey mechanical vibrations to the ramp. The ramp may be configured to comprise one or both of (i) at least one aperture disposed across a top surface of the ramp, the at least one aperture defining at least one void through the ramp, and (ii) a bevel along a length of the top surface of the ramp, the bevel configured to cause loose powder to be moved off the ramp.

The system may further comprise a powder collection system configured to collect unbound powder from the powder print bed. The collection system may comprise at least one guiding component and at least one collection reservoir.

The at least one separating plate may be a printed layer of bound powder, created by a binder jet printer subsystem as the powder print bed is formed.

The at least one separating plate may be inserted between adjacent layers of the powder print bed when one or both of the adjacent layers of the powder print bed have been at least partially completed.

The at least one separating blade may comprise at least one aperture at a leading edge of the separating blade. The aperture(s) may extend longitudinally through the separating blade to form void(s) longitudinally through the blade. The void(s) may be configured to channel loose powder from the powder print bed as the blade is inserted into the powder print bed.

The de-powdering subsystem may further comprise a bath subsystem. The bath subsystem may comprise a reservoir configured to contain a liquid and to accept objects to be de-powdered into the liquid, and an agitation facility configured to cause currents within the liquid. The agitator facility may be at least one of (i) a pump configured to circulate the liquid within the reservoir, (ii) a heating element configured to generate convection currents in the liquid, and (iii) a stirrer driven through a linkage to a motor. The bath subsystem may comprise at least one ultrasonic transducer configured to apply ultrasonic vibrations to the liquid within the reservoir.

The one or more objects within the stacked powder print bed may be formed using a water-fast binding agent. The water-fast binding agent may comprise polyacrylic acid.

In another aspect, the invention may be a method of separating objects within a stacked powder bed of nested objects. The method may comprise mechanically and electrically engaging a build box to a de-powdering system, and inserting, by the de-powdering subsystem, a separating blade through an aperture in a side wall of the build box and into the stacked powder bed between the a top-most object of the nested objects and a second object directly below the top-most object, so as to form an isolated powder print bed between the separating blade and a top of the build box. The method may further comprise removing, by the de-powdering subsystem, unbound powder from the isolated powder print bed.

Removing the unbound powder further may further comprise directing an air jet into the isolated powder print bed to agitate the unbound powder and withdrawing the agitated unbound powder with a vacuum device. The method may further comprise directing the air jet towards the object within the isolated powder print bed using a robotic arm. The method may further comprise agitating the unbound powder with a secondary agitator.

The method of may further comprise withdrawing the separating blade from the build box through the aperture, and raising a build box floor toward the top of the build box, thereby moving the second object to a top-most position of the nested objects. The method may further comprise re-inserting the separating blade through the elongated aperture and into the powder print bed below the second object, thereby forming the isolated powder print bed between the separating blade and the build box top. The method may further comprise removing, by the de-powdering subsystem, unbound powder from the isolated powder print bed. The method may further comprise repeating the withdrawing, raising, re-inserting and removing steps for other objects within the stacked powder bed of nested objects.

In another aspect, the invention may be a de-powdering system for removing unbound powder from a stacked powder print bed of nested object. The de-powdering system may comprise an interface for mechanically and electrically connecting to a build box that hosts the stacked powder bed of nested objects, and a separating blade associated with the de-powdering subsystem. The separating blade may be configured to be inserted through an elongated aperture formed in a sidewall of the build box and into the powder print bed, between the a top-most object of the nested objects and a second object directly below the top-most object, thereby forming an isolated powder print bed between the separating blade and the build box top. The de-powdering system may further comprise at least one air jet device configured to agitate unbound powder within the isolated powder print bed, and at least one vacuum device configured to withdraw the agitated unbound powder from the isolated powder print bed.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4A, 4B and 4C show a more detailed view of the elongated aperture within the build box of FIG. 3.

FIG. 6B shows an example of a bath subsystem according to the invention.

DETAILED DESCRIPTION

A description of example embodiments of the invention follows.

The teachings of all patents, published applications and references cited herein are incorporated by reference in their entirety.

Figure 1:
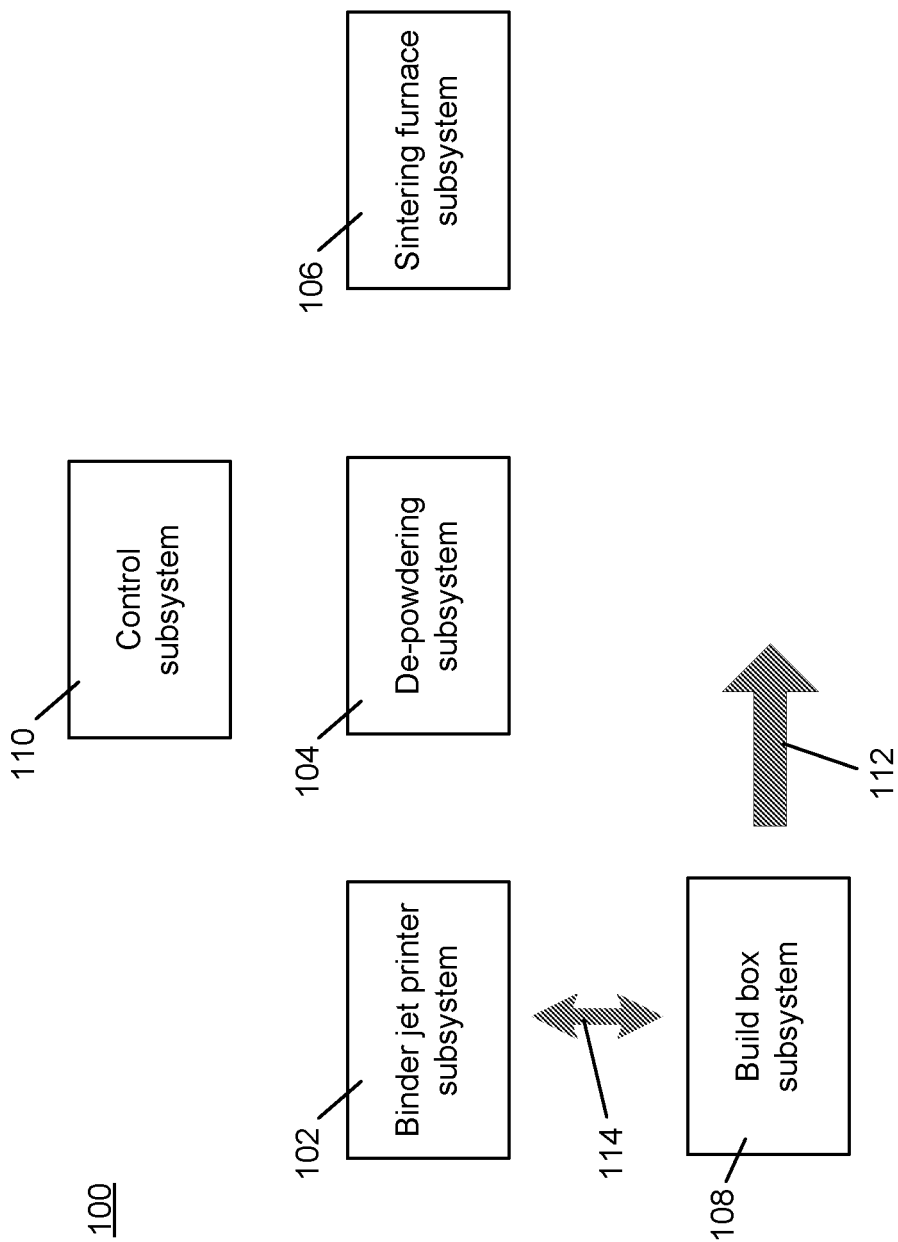
FIG. 1 shows an example powder bed fabrication system constructed and arranged according to the invention.

FIG. 1 shows an example powder bed fabrication system 100, constructed and arranged according to the invention. A powder bed fabrication system 100 may comprise a binder jet printer subsystem 102, a de-powdering subsystem 104, a sintering furnace subsystem 106, a build box subsystem 108, and a control subsystem 110. As shown in FIG. 1, the build box subsystem 108 may be moved 112 within the powder bed fabrication system 100, to be associated 114 (mechanically, electrically, or both) with one of the binder jet printer subsystem 102, the de-powdering subsystem 104, or the sintering furnace subsystem 106, depending on the state of processing the object (or objects) within the build box subsystem 108. The control subsystem 110 may communicate with one or more of the binder jet printer subsystem 102, the de-powdering subsystem 104, the sintering furnace subsystem 106, and the build box subsystem 108 through, for example, a wired or wireless network architecture (not shown). The control subsystem 110 may monitor, coordinate and supervise the fabrication of the object(s) within the build box subsystem 108 as the build box subsystem 108 passes through the system 100. Further, the wired or wireless network architecture (not shown) may facilitate communication between any of the subsystems within the powder bed fabrication system 100

Figure 2:
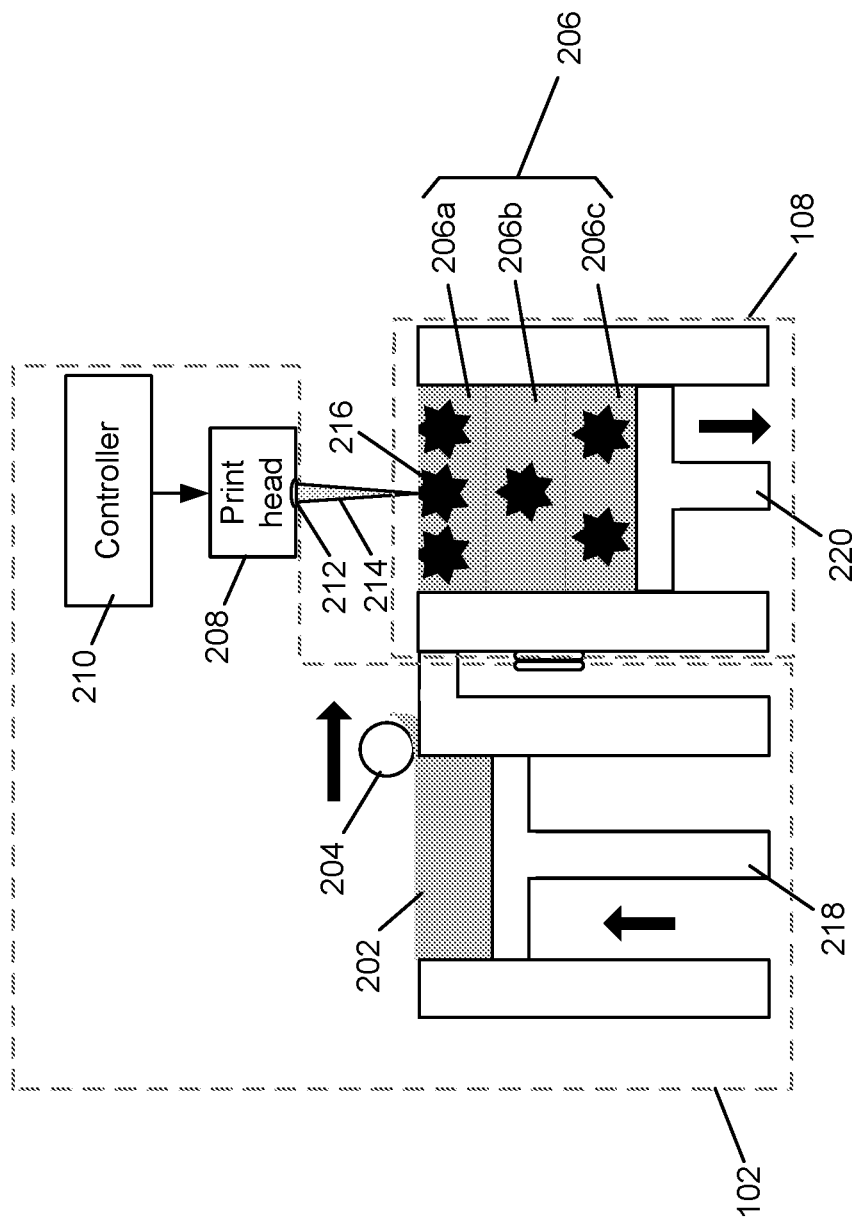
FIG. 2 shows an example binder jet printer subsystem, operating in conjunction with a build box according to the invention.

An example binder jet printer subsystem 102, operating in conjunction with a build box 108, is shown in FIG. 2. The binder jet printer subsystem 102 may include a powder supply 202, a spreader 204 (e.g., a roller) configured to be movable across the powder bed 206 of the build box subsystem 108, a print head 208 movable across the powder bed 206, and a controller 210 in electrical communication with the print head 208. The powder bed 206 may comprise, for example, micro-particles of a metal, micro-particles of two or more metals, or a composite of a one or more metals and other materials.

The spreader 204 may be movable across the powder bed 206 to spread a layer of powder, from the powder supply 202, across the powder bed 206. The print head 208 may comprise a discharge orifice 212 and, in certain implementations, can be actuated to dispense a binder material 214 (e.g., through delivery of an electric current to a piezoelectric element in mechanical communication with the binder 214) through the discharge orifice 212 to the layer of powder spread across the powder bed 206. In another example embodiment, layers of powder may be applied to the powder print bed 206 by a hopper followed by a compaction roller. The hopper moves across the powder print bed, depositing powder along the way. The compaction roller follows the hopper, spreading the deposited powder to form a uniform layer of powder.

In operation, the controller 210 may actuate the print head 208 to deliver the binder material 214 from the print head 208 to each layer of the powder in a controlled two-dimensional pattern, as the print head 208 moves across the powder bed 206. In embodiments, the movement of the print head, and the actuation of the print head to deliver the binder material 214, may be coordinated with movement of the spreader 204 across the print bed 206. For example, the spreader may spread a layer of the powder across the print bed 206, and the print head may deliver the binder in a controlled, two-dimensional pattern, to the layer of the powder spread across the print bed, to form a layer of at least one three-dimensional object 216. These steps may be repeated (e.g., with controlled two-dimensional pattern for each respective layer) in sequence to form subsequent layers until, ultimately, the three-dimensional object 216 is formed in the powder bed 206. The powder print bed 206 may comprise nested layers 206a, 206b, 206c, shown delineated by a dashed line. Each of the nested layers may comprise one or more objects 216.

The binder jet printer subsystem 102 may comprise a powder supply actuator mechanism 218 that elevates the powder supply 202 as the spreader layers the powder across the print bed 206. Similarly, the build box subsystem 108 may comprise a build box actuator mechanism 220 that lowers the powder bed 206 incrementally as each layer of powder is distributed across the powder bed 206. In some embodiments, separating plates may be disposed upon the powder print bed 206 as an object or objects are completed, so that a subsequent powder bed layer may be printed, thereby forming two or more nested layers of object(s) within the powder bed 206.

Figure 3A:
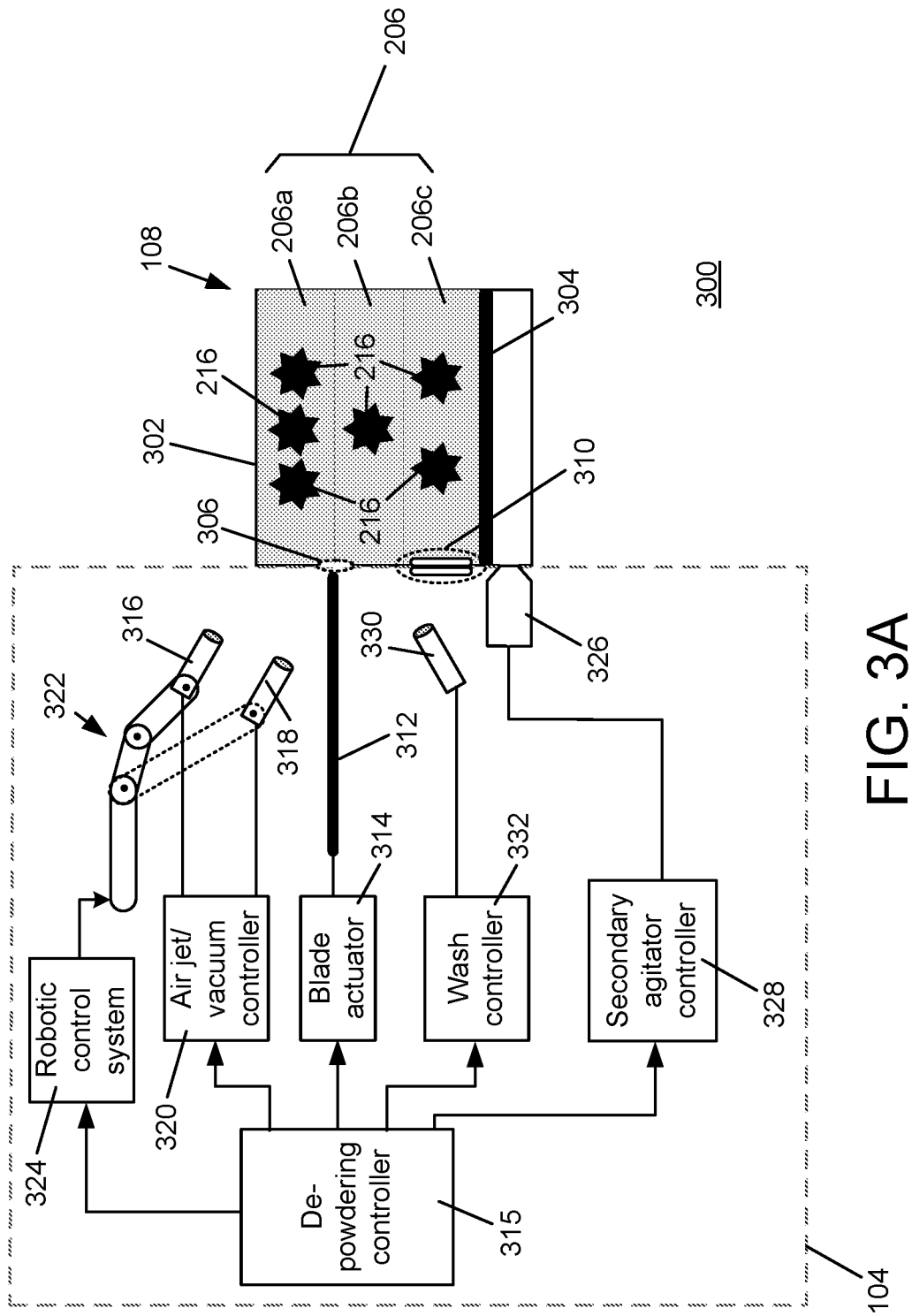
FIG. 3A shows a system for separating the objects within a stacked powder print bed of nested objects according to the invention.

The described embodiments of the de-powdering subsystem 104 may include a system 300 for separating the objects 216 within a stacked powder print bed 206 of nested objects 216, as shown in FIG. 3A. The system may include a build box 108 configured to contain the powder print bed 206, and a de-powdering system 104. The build box 108 may be characterized by a build box top 302 and a build box floor 304. Each layer of the stacked powder print bed 206 may host one or more objects 216 being fabricated, each within a nested layer 206a, 206b, 206c within the powder print bed 206.

The build box 108 may include an elongated aperture 306 formed in a side wall of the build box. FIGS. 4A and 4B show a more detailed view of the elongated aperture 306 within the build box 108 and. FIG. 4B is a sectional view of the build box 108 shown in FIG. 4A.

The de-powdering subsystem 104 may be configured to mechanically and electrically engage the build box 108. The de-powdering subsystem 104 may couple to the build box subsystem 108 through a coupling interface 310 that facilitates removably engaging the build box subsystem 108 with de-powdering subsystem 104. The coupling interface may comprise a mechanical aspect that provides for physical engagement, and an electrical aspect that supports electrical communication between the build box subsystem 108 to the de-powdering subsystem 104. The electrical interface component of the coupling interface 310 may be hard-wired, such as through a mating set of electrical connectors. Alternatively or in addition, the electrical interface component of the coupling interface may be a wireless connection. Alternatively or in addition, the electrical interface component of the coupling interface may be an optical connection, such as an optical scanner configured to read a bar code.

The de-powdering subsystem 104 may comprise an associated separating blade 312. The separating blade 312 may be configured to be inserted, by a blade actuator 314, through the elongated aperture 306 and into the powder print bed 206. The blade 312 may be inserted between a top-most object or objects 216 within the top nested layer 206a of the nested objects and a second object or objects 216 within the nested layer 206b below and contiguous with the top-most layer 206a, thereby forming an isolated powder print bed 402 between the separating blade 312 and the build box top 302, as shown in FIG. 4C. The blade actuator may be controlled by a de-powdering controller 315. The blade actuator may comprise a vibration mechanism to vibrate the blade 312 as the blade 312 is inserted into the powder print bed 206, in order to facilitate entry if the blade 312 into the powder bed 206.

Figure 3B:
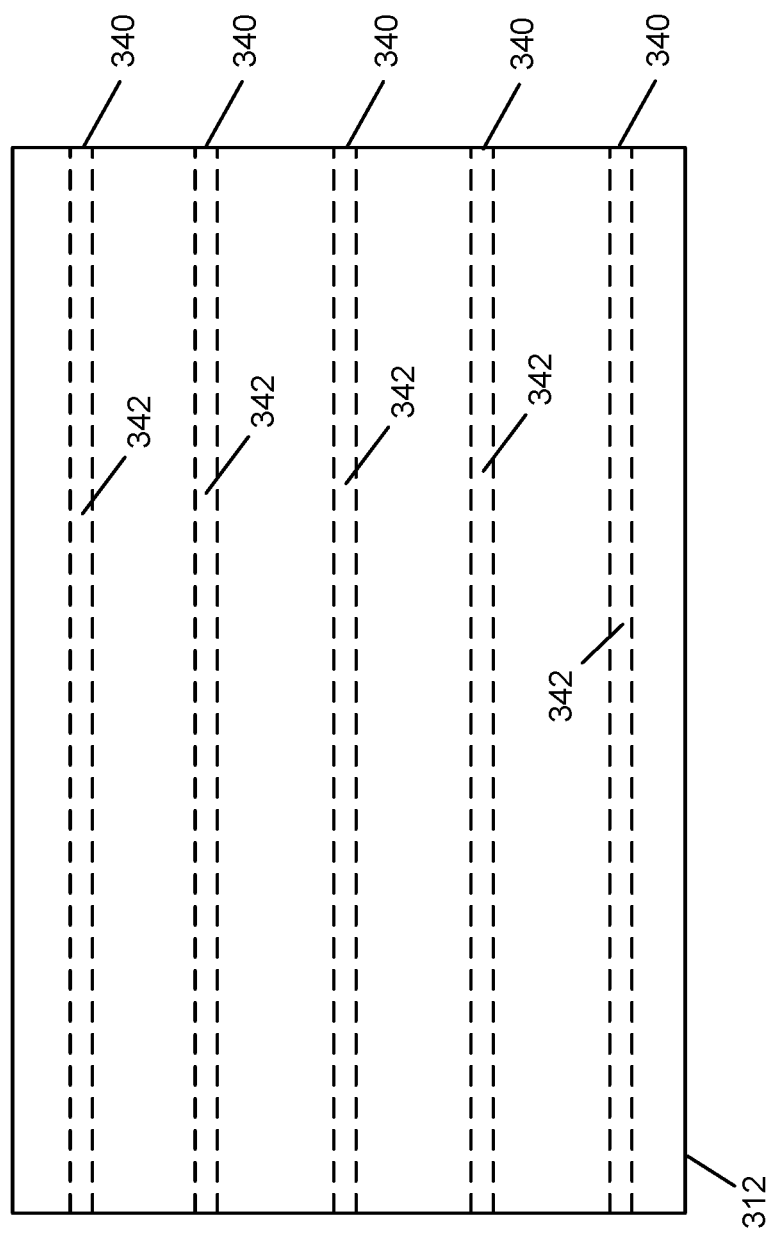
FIG. 3B shows an example of a separating blade with hollow apertures.

The blade 312 may include apertures 340 at the leading edge of the blade (the edge of the blade to be inserted into the powder print bed 206), as shown in FIG. 3B. The apertures may extend longitudinally through the blade 312, forming hollow passages 342 through the blade 312. While the hollow passages 342 may be substantially parallel to the direction of insertion, other orientations through the blade 312 may also be used to further facilitate the transport of the powder through the passages. For example, the hollow passages 342 may be angled downward so that the force of gravity may assist moving loose powder through the passages.

In an alternative embodiment, the nested layers 206a, 206b, 206c may be separated by a printed plate. The printed plate may be formed during the printing process described herein, as other objects in the powder print bed are formed. The printed plate may be cross-linked along with the printed objects, and removed during the de-powdering process while separating the layers. An advantage of this alternative embodiment is that the blade 312 of the de-powdering process, and elongated aperture 306, both described herein, are not required. In some embodiments, the plate may be printed to include designations identifying the objects located in an adjacent layer and/or the position and/or orientation of the object(s) within the layer.

The de-powdering subsystem 104 may further comprise at least one air jet device 316 configured to agitate unbound powder within the isolated powder print bed, and at least one vacuum device 318 configured to withdraw the agitated unbound powder from the isolated powder print bed. The air jet device 316 and the vacuum device 318 may be controlled by an air jet/vacuum controller 320. The air jet device 316 may comprise one or more of a high-volume, coarse de-powdering air jet device, and a low volume, fine de-powdering air jet device. The air jet device 316 may alternatively deliver an abrasive material or other type material (e.g., water or solvent) to assist in the de-powdering operation, similar to the functioning of a sand blaster.

The air jet device 316 may further include a brush or other mechanical agitation device to assist with loosening and/or moving the powder. Alternatively, such brushes may be used in isolation (i.e., without the air jet device) to agitate the unbound powder.

The air jet device 316 may comprise one or more jetting profiles. Each jetting profile may comprise a particular spatial characteristic (e.g., a focused, conical air jet, a broad, cylindrical air jet, a fan-shaped air jet, etc.), an/or a time profile (e.g., a particular time sequence of different types of air jet spatial characteristics). An embodiment of the de-powdering system 104 may utilize heat convection as a de-powdering agitation agent instead of or in addition to air jetting or other techniques described herein.

The air jet device 316 and/or the vacuum device 318 may be conveyed by at least one robotic arm 322 to locations within the isolated powder print bed. The robotic arm 322 may be guided by a robotic control system 324 using information related to a surface associated with the one or more objects in a top-most layer of the powder print bed. The surface may be the surface of the object itself, which delineates the bound powder of the object and the unbound powder surrounding the object. The surface may alternatively be a geometric shape that encompasses one or more objects in the powder print bed. The geometric shape may encompass the object(s) and some amount of loose powder. The information related to the surface may be derived from a model of the at least one object in the top-most layer of the powder print bed. The robotic control system 324 may maneuver the robotic arm 322 to progressively move the end effector of the robotic arm 322 (e.g., the air jet, the vacuum device, etc.) across the print bed to loosen (e.g., break up and cause to move) the non-cross-linked or otherwise unbound powder.

The de-powdering subsystem 104 may further comprise a secondary agitator 326, controlled by a secondary agitator controller 328. The secondary agitator may comprise a mechanical vibration generator configured to convey mechanical vibrations directly to the build box 108. The mechanical vibration generator may be configured to deliver vibrations to a particular region of the powder bed 206 within the build box 108. The secondary agitator 326 may be an ultrasonic generator for conveying ultrasonic energy to a particular region of the powder bed 206 within the build box 108.

The build box 108 may further comprise an elevator configured to raise the build box floor toward the build box top 302 following a withdrawal of the separating blade 312, thereby moving the object or objects in the second print bed layer to a top-most position of the nested objects. The de-powdering subsystem 104 may be configured to re-insert the separating blade 312 through the elongated aperture 310 and into the powder print bed below the second print bed layer, again forming an isolated powder print bed between the separating blade and the build box top.

The de-powdering subsystem 104 may comprise a washing device 330 configured to convey a washing solution to the top-most object, a wash vacuum device configured to remove the washing solution conveyed to the top-most object, and a wash air jet device configured to dry the washing solution from the top-most object. The wash air jet device may be the air jet device 316 described herein, and the wash vacuum device may be the vacuum device 318 described herein, or they may be devices (not shown) other than the devices 316, 318 described herein. One or more of the washing device 330, the wash vacuum device and the wash air jet device may be controlled by a wash controller 332. One or more of the washing device 330, the wash vacuum device and the wash air jet device may be manipulated by a robotic arm, controlled by a robotic control system as described herein.

Embodiments may further include an agitation agent associated with the activity of the washing device 330 to enhance the washing activity. For example, a coarse movement (such as a vibration profile or discrete mechanical impacts) may be applied to the powder print bed being de-powdered, and/or an application of ultrasonic energy to the powder print bed.

The orientation of the build box 108 may be altered to facilitate gravity-assist of the de-powdering process. For example, the build box 108 may be tilted at various angles during de-powdering and/or washing to allow the force of gravity to assist with the powder removal.

The build box 108 may comprise an identifier linked to state information that describes characteristics of the stacked powder print bed of nested objects. The de-powdering subsystem 104 may utilize the state information to facilitate one or more de-powdering operations.

The system 300 may include a robotic arm, similar to the robotic arms described herein, configured to access and to manipulate at least one of the nested objects. The robotic arm is configured to remove the at least one nested object from the powder print bed.

Figure 5A:
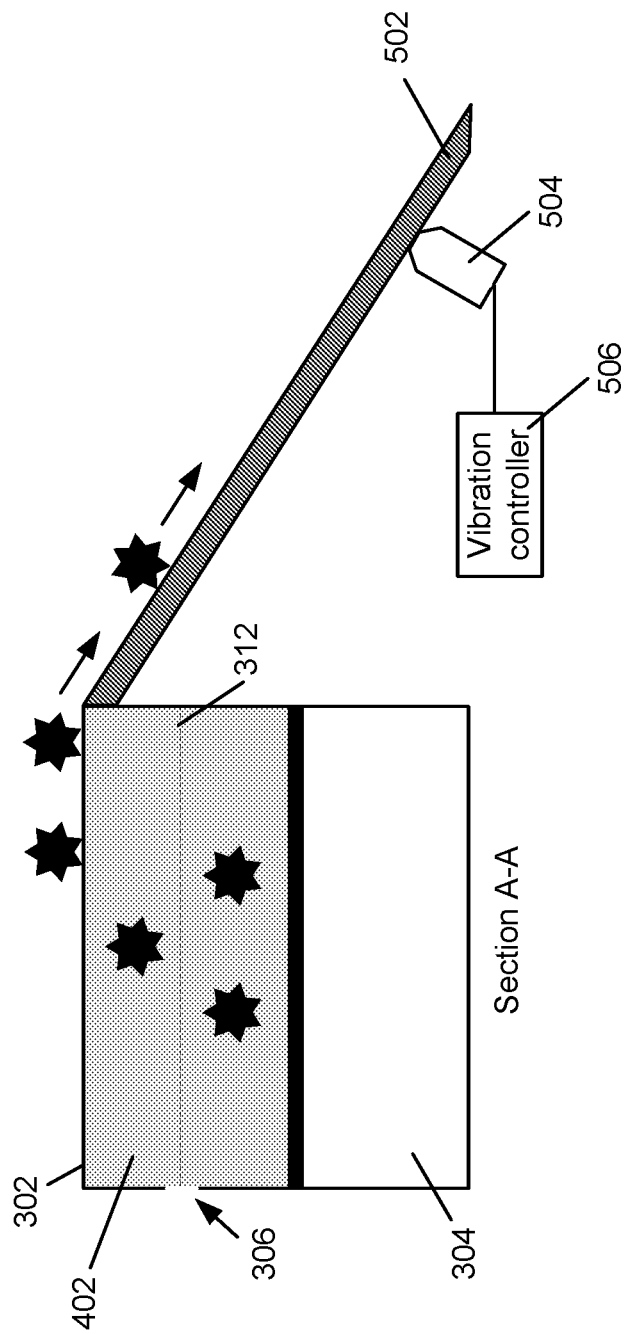
FIG. 5A shows an example of a ramp associated with the build box of FIG. 3.
Figure 5B:
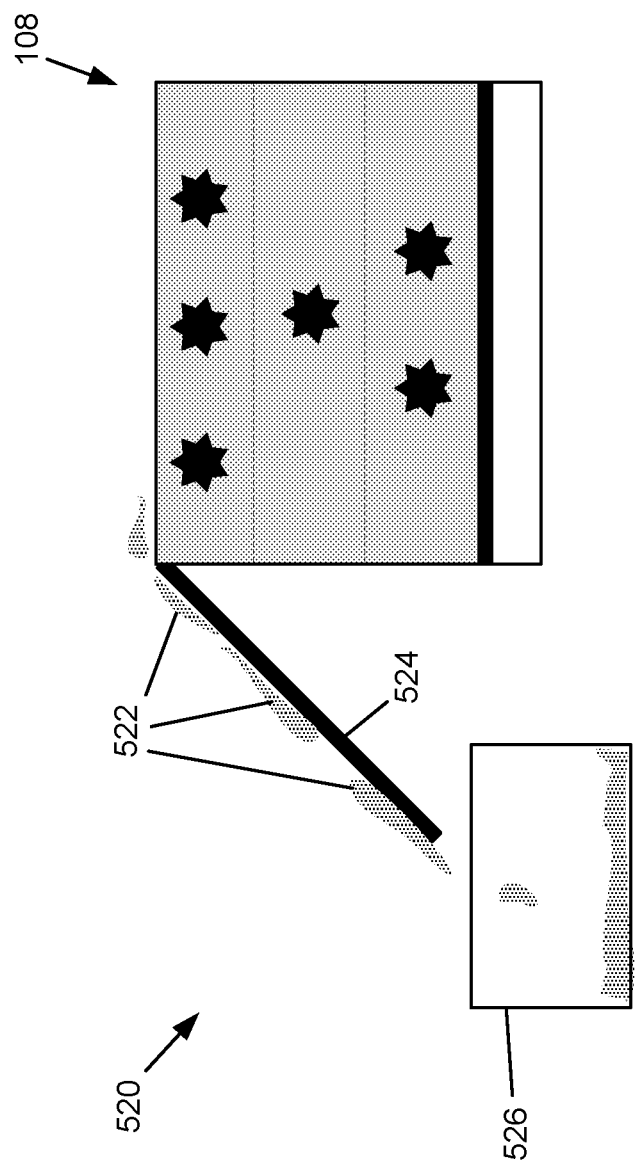
FIG. 5B shows an example of a powder collection system according to the invention.

As illustrated in the example of FIG. 5A, the system 300 may further comprise a ramp 502 associated with the build box 108. The ramp may be configured to accommodate conveyance of at least one of the nested objects from the powder print bed to a location outside of the build box. Associated with the ramp may be a mechanical vibration generator 504, controlled by a ramp vibration controller 506, configured to convey mechanical vibrations to the ramp 502. In some embodiments, the ramp 502 may be configured to enhance the de-powdering process. For example, the ramp 502 may be perforated by apertures configured to allow loose powder to fall through the ramp 502 as the object progresses along the ramp 502. As another example, portions of the ramp 502 may be beveled or otherwise angled to allow loose powder to fall away from the ramp 502 as the object progresses along the ramp 502.

The de-powdering subsystem 104 may further comprise a powder collection system 520 for collecting unbound powder 522 removed from the powder bed. The collection system 520 may include one or more guiding components 524 (such as panels, channels, baffles, conduits, etc.) configured to guide the unbound powder to one or more collection reservoirs 526. The collection system 520 may rely on gravity for conveying the unbound powder along the panes and channels 524, or it may facilitate powder moving techniques, such as air jets, vacuums, vibrations, conveyer mechanisms, or other such powder transporting techniques known in the art. The collection system 520 may include containment components configured to prevent the unbound powder 522 from escaping a local area as the unbound powder experiences forces due to air jet, vibration and washing processes described herein. The collection system 520 may further include screening or other filtering facilities to separate unbound powder components of different sizes and granularities.

The powder bed fabrication system 100 may employ a water-fast printing technique, so that a water-based de-powdering process may be used. Water-based de-powdering may be desirable because water-based de-powdering may be more effective, compared to other methods (air, vibration, etc.), for removing unbound powder from bound printed objects without damaging the weakly-bound objects prior to sintering of the objects.

Water-fast binder jet printing may be accomplished by utilizing a water-fast (i.e., water-insoluble) solvent in the binding material. One example of such a water-fast solvent is polyacrylic acid (PAA) combined with glycerol (e.g., 10% glycerol solution). Such a solvent is known to crosslink at approximately 200° C. Other formulations of water-fast binding agent may also be used. Such alternative formulations may be crosslinked by various techniques, such as application of heat or by application of ultraviolet (UV) or radio frequency radiation.

Some metals cannot be subjected to water-based de-powdering, because application of water may lead to corrosion or other reactive process associated with the metal. For such metals, de-powdering liquids other than water may be used, for example alcohol. The binding agent is selected according to the particular de-powdering liquid, such that the binding agent is not soluble by the de-powdering liquid.

Water-based (or more generally, liquid-based) de-powdering may be used alone, or in conjunction with other de-powdering techniques such as air jetting or vibration. For example, initial de-powdering may be accomplished by air jetting and/or vibration as described herein, for gross removal of unbound powder. Liquid-based de-powdering may then be used to remove any remaining unbound powder.

Figure 6A:
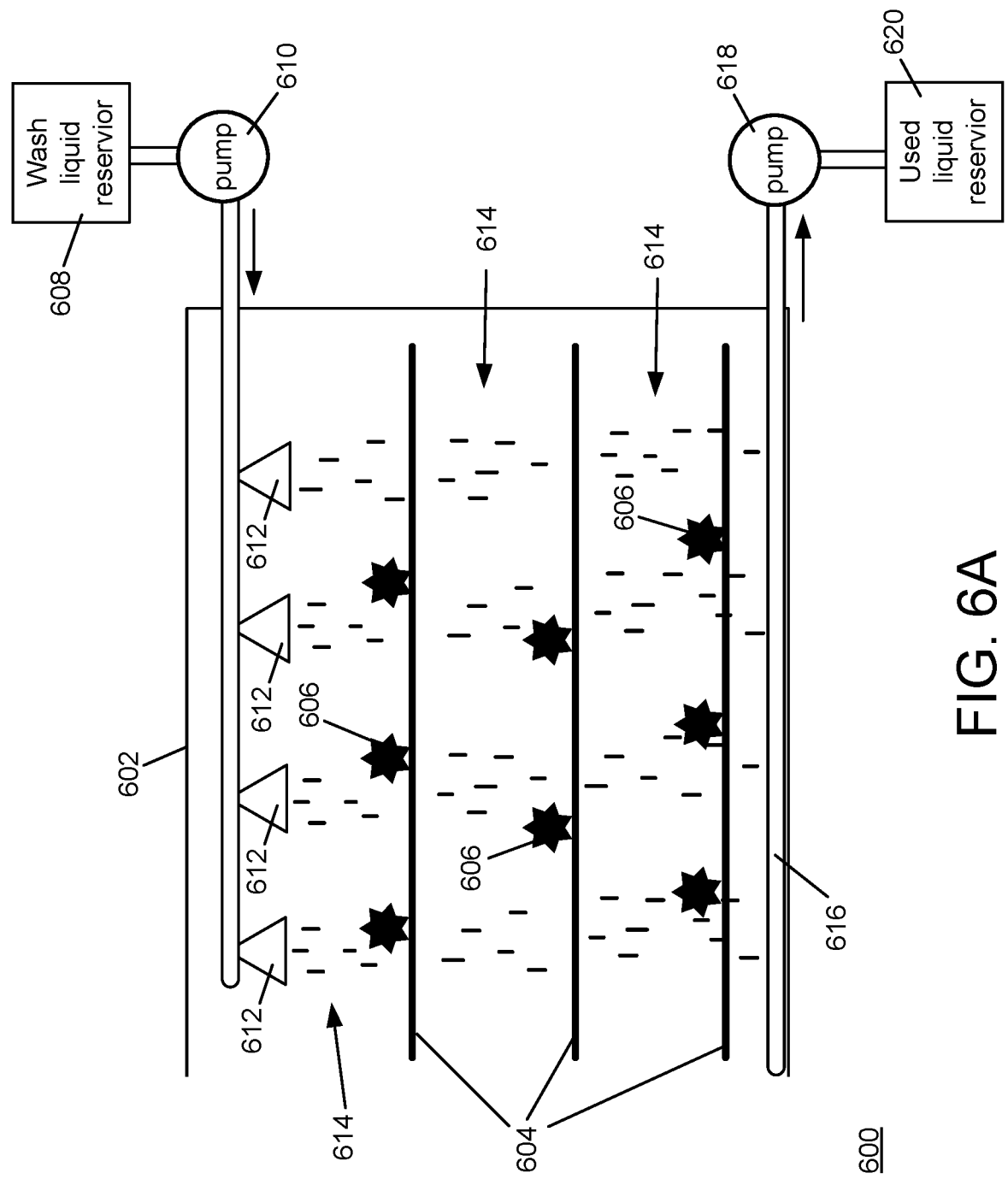
FIG. 6A shows an example of a washing device according to the invention.

Liquid-based de-powdering may be accomplished apart from the build box 104, after gross de-powdering. Partially de-powdered objects may be removed from the build box 104 and placed in a washing device 600, as shown in the example of FIG. 6A. Such an example washing device may include a housing 602 with one or more drawers 604 upon which partially de-powdered objects 606 are placed. The washing device 600 further includes a wash liquid reservoir 608 that contains clean washing liquid. A first pump 610 moves washing liquid from the wash liquid reservoir 608 to washing heads 612 that spray the washing liquid 614 onto the objects 606. The drawers are perforated so that the sprayed washing liquid passes through them to the bottom of the housing 602, carrying unbound powder with it. A drain 616 collects the used washing liquid. A second pump 618 moves the collected used washing liquid into a used washing liquid reservoir 620.

The de-powdering subsystem 104 may further comprise a bath subsystem 630, in which the powder print bed (or portions thereof) may be immersed in a liquid (e.g., water or a solvent specific to the powder components of the powder print bed) to accomplish or contribute to the de-powdering process. As illustrated in the example embodiment of FIG. 6B, the bath subsystem 630 may comprise a reservoir 632 for containing the liquid 634, along with baskets 636 or other supporting devices that may be used to suspend the object(s) 638 within the liquid. Currents may be generated within the liquid to agitate, loosen and convey loose powder away from the bound powder forming the object(s) 638. The currents may be convection currents 640, generated by heating elements 642 within the reservoir 632. The currents may be generated in other ways, for example by circulating the liquid within the bath through pumps 644, or by movement of the reservoir 632 itself (e.g., by tilting and/or rotating the reservoir), or by stirring the liquid with a motorized stirrer 646 driven with a motor 648 directly through a drive shaft (not shown) or indirectly through a magnetic link, or the currents may be generated by other techniques known in the art. In some embodiments, ultrasonic transducers 650 may be employed to apply ultrasonic vibrations to the liquid within the bath subsystem. The constituent components of the bath subsystem may be controlled by a bath control module 652, which may communicate with other subsystems of the powder bed fabrication system 100, for example with the control subsystem 110.

Some metal materials used in the embodiments described herein are reactive to ordinary air. For such metal materials, the de-powdering subsystem 104 may implement a locallyinert atmosphere, using gases such as nitrogen or argon, to prevent the powder print bed components (i.e., objects and loose powder) from reacting with the ambient atmosphere. In such embodiments, the agitation facilities used to de-powder the objects in the powder print bed (e.g., air jets) also utilize non-reactive components (e.g., argon, nitrogen) to loosen and remove the unbound powder. The de-powdering subsystem may cooperate with the powder print bed, by providing sensors and control/communications components, to generate and convey an indication that the local subsystem has been inerted. The de-powdering system being "inerted" means that the atmosphere within the de-powdering system, to which the reactive metal materials in the subsystem are exposed, comprises sufficient inert components for the atmosphere to be below a reactivity threshold associated with the relevant reactive metal material(s).

Figure 7:
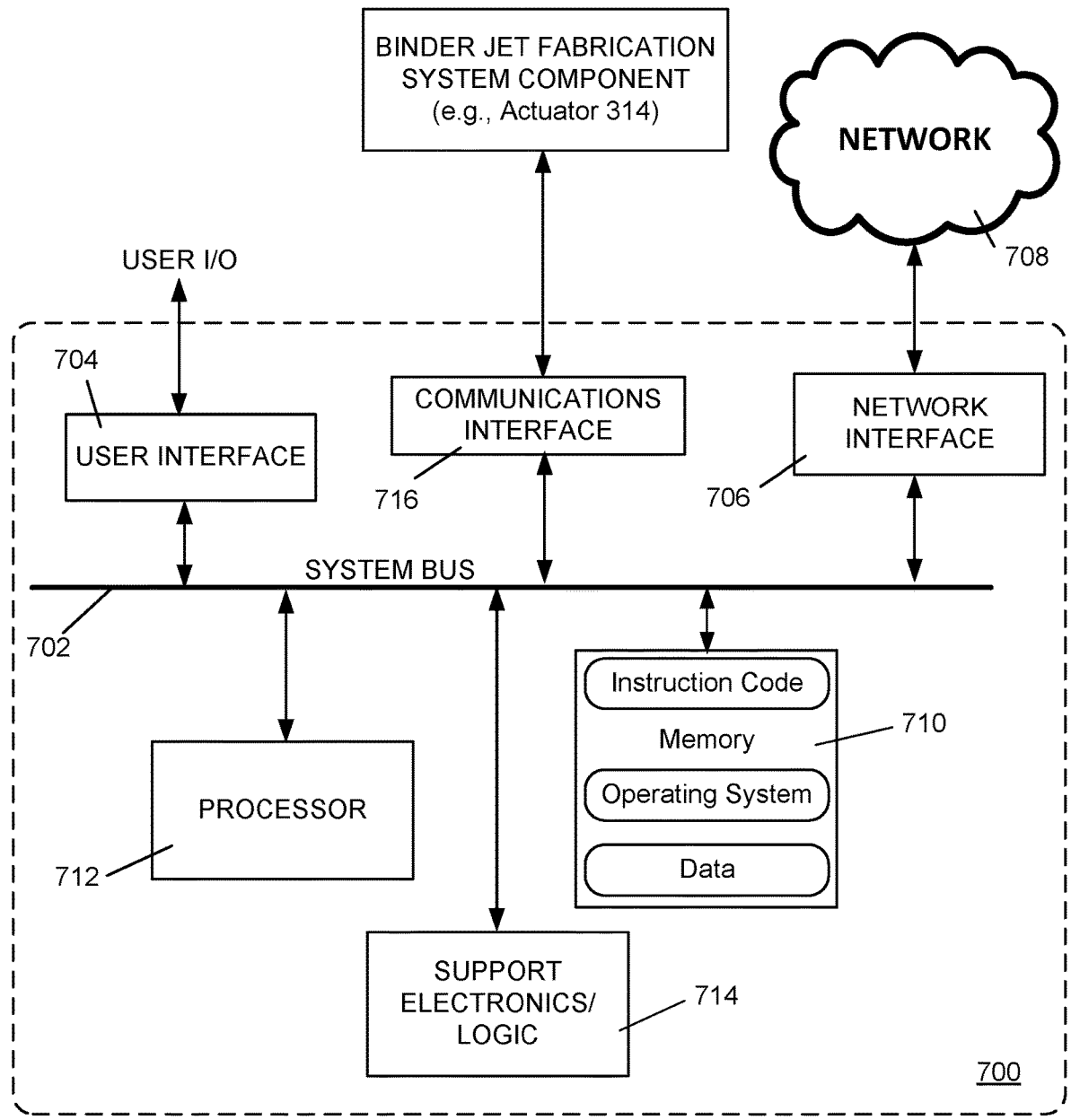
FIG. 7 is a diagram of an example internal structure of a processing system that may be used to implement one or more of the embodiments herein.

FIG. 7 is a diagram of an example internal structure of a processing system 700 that may be used to implement one or more of the embodiments herein. Each processing system 700 contains a system bus 702, where a bus is a set of hardware lines used for data transfer among the components of a computer or processing system. The system bus 702 is essentially a shared conduit that connects different components of a processing system (e.g., processor, disk storage, memory, input/output ports, network ports, etc.) that enables the transfer of information between the components.

Attached to the system bus 702 is a user I/O device interface 704 for connecting various input and output devices (e.g., keyboard, mouse, displays, printers, speakers, etc.) to the processing system 700. A network interface 706 allows the computer to connect to various other devices attached to a network 708. Memory 710 provides volatile and non-volatile storage for information such as computer software instructions used to implement one or more of the embodiments of the present invention described herein, for data generated internally and for data received from sources external to the processing system 700.

A central processor unit 712 is also attached to the system bus 702 and provides for the execution of computer instructions stored in memory 710. The system may also include support electronics/logic 714, and a communications interface 716. The communications interface may comprise an interface to a component of the system, such as the separator blade actuator 314 described with reference to FIG. 3.

In one embodiment, the information stored in memory 710 may comprise a computer program product, such that the memory 710 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method for separating one or more additively fabricated parts from a powder, the method comprising:
   transferring a mixture of one or more additively fabricated parts and a powder into a container having a plurality of perforations therein, wherein the powder is a metal powder and wherein the additively fabricated parts comprise particles of the metal powder and at least one binding agent;
   immersing at least part of the perforated container within a bath of a liquid, thereby immersing at least part of the mixture of the one or more additively fabricated parts and the powder in the liquid; and
   generating fluid currents within the liquid which pass through perforations of the container and thereby convey at least some of the powder from the mixture of the one or more additively fabricated parts and the powder to outside of the container.

2. The method of claim 1, wherein the fluid currents are generated, at least in part, by circulating the liquid through the bath with one or more pumps.

3. The method of claim 1, wherein the fluid currents are generated, at least in part, by heating the bath of the liquid to produce convection currents.

4. The method of claim 1, wherein the fluid currents are generated, at least in part, by a motorized stirrer arranged within the bath.

5. The method of claim 1, wherein the fluid currents are generated, at least in part, by an ultrasonic transducer.

6. The method of claim 1, wherein the liquid comprises water.

7. The method of claim 1, wherein the liquid comprises a solvent.

8. The method of claim 1, wherein the at least one binding agent is not soluble by the liquid.

9. The method of claim 1, wherein the container is a basket.

* * * * *